United States Patent [19]

Torimitsu et al.

[11] Patent Number: 4,838,702

[45] Date of Patent: Jun. 13, 1989

[54] ELECTRIC CONTROL APPARATUS FOR ICECREAM-MAKING MACHINE

[75] Inventors: Hiroshi Torimitsu; Yukimasa Takeda; Koji Tsuchikawa, all of Toyoake, Japan

[73] Assignee: Hoshizaki Denki Kabushiki Kaisha, Toyoake, Japan

[21] Appl. No.: 214,359

[22] Filed: Jul. 1, 1988

[30] Foreign Application Priority Data

Jul. 2, 1987 [JP] Japan .................. 62-102190

[51] Int. Cl.$^4$ .............................. B01F 15/06
[52] U.S. Cl. ......................... 366/149; 62/342; 366/144; 366/601
[58] Field of Search ............... 366/144, 149, 142, 145, 366/601; 62/342, 343, 135, 136; 99/452, 453, 455; 318/309, 310

[56] References Cited

U.S. PATENT DOCUMENTS

| | | | |
|---|---|---|---|
| 4,142,378 | 3/1979 | Bright | 62/135 |
| 4,583,863 | 4/1986 | Pandolfi | 366/149 |
| 4,655,605 | 4/1987 | Cipeletti | 366/149 |
| 4,664,529 | 5/1987 | Cavalli | 366/149 |
| 4,681,458 | 7/1987 | Cavalli | 62/342 |

Primary Examiner—Robert W. Jenkins
Attorney, Agent, or Firm—Armstrong, Nikaido, Marmelstein Kubovcik & Murray

[57] ABSTRACT

An electric control apparatus for an icecream-making machine wherein a stirring paddle is settled in an icecream-forming container in conditions for thermal exchange with an evaporator of a refrigerating system and is driven by an electric motor to whip icecream ingredients stored in the container. The electric control apparatus is arranged to detect the rotational speed of the paddle for producing a pulse signal at a period inversely proportional to the detected rotational speed, to produce an output signal when $1/n$ of the period of the pulse signal is more than a predetermined period of time and to cease production of the output signal when $1/n$ of the period of the pulse signal becomes less than the predetermined period of time, and to permit supply of an electric power to the motor when production of the output signal is ceased and to cut off the supply of the electric power to the motor in response to the output signal.

4 Claims, 2 Drawing Sheets

ELECTRIC CONTROL APPARATUS FOR ICECREAM-MAKING MACHINE

BACKGROUND OF THE INVENTION

1. Field of the Invention

The present invention relates to an icecream-making machine for domestic use wherein a stirring paddle is settled in an icecream-forming container in conditions for thermal exchange with an evaporator coil of a refrigerating system and driven by an electric motor to whip icecream ingredients, and more particularly to an electric control apparatus for automatically stopping the electric motor in the icecream-making machine when the icecream has been completed on its achieving a preferred consistency.

2. Description of the Prior Art

In Japanese Patent Early Publication No. 61-43960, there has been proposed an icecream-making machine wherein the electric current drawn by an electric motor for a stirring paddle is measured to detect a preferred consistency (or viscosity) of icecream formed by rotation of the stirring paddle thereby to automatically stop the electric motor when the measured current has increased up to a preset current value. In Japanese Utility Model Publication No. 56-30222, there has been proposed an icecream-making machine wherein an electric motor for a stirring paddle is stopped when it has been continually supplied with an over-current for a predetermined period of time during preparation of icecream.

If in such convertional icecream-making machines as described above the predetermined current value or period of time is too large or too long, the electric motor will be stopped with a time delay after the icecream has been completed on its achieving a preferred consistency. This results in an increase of electric power consumption and an increase of objectionable stresses acting on the electric motor. Even if the predetermined current value or period of time was selected to stop the electric motor without any time delay after the icecream has been completed on its achieving the preferred consistency, the electric motor would be stopped prematurely due to a difference in characteristics of the electric motor or a difference in commercial frequency of an electric power source. In such a case, the prepared icecream will show poor consistency. In an attempt to solve the problem, it is required to preset the predetermined current value or period of time taking into account of each characteristic of the electric motor and each commercial frequency of the electric power source.

SUMMARY OF THE INVENTION

It is, therefore, a primary object of the present invention to provide an electric control apparatus for an icecream-making machine capable of automatically stopping the electric motor without any time delay in a simple and reliable manner.

According to the present invention, the object is attained by an electric control apparatus for an icecream-making machine wherein a stirring paddle is settled in an icecream-forming container in conditions for thermal exchange with an evaporator coil of a refrigerating system and is driven by an electric motor to whip icecream ingredients stored in the container. The electric control apparatus comprises sensing means for detecting the rotational speed of the stirring paddle for producing a pulse signal therefrom at a period inversely proportional to the detected rotational speed, output means responsive to the pulse signal for producing an output signal therefrom when 1/n of the period of the pulse signal is more than a predetermined period of time and for ceasing production of the output signal when 1/n of the period of the pulse signal has become less than the predetermined period of time, and power supply means for permitting supply of an electric power to the electric motor when the output means is conditioned to cease production of the output signal and for cutting off the supply of the electric power to the motor in response to the output signal from the output means.

BRIEF DESCRIPTION OF THE DRAWINGS

Other objects, features and advantages of the present invention will be readily appreciated from the following detailed description of preferred embodiments thereof when considered with reference to the accompanying drawings, in which.

DESCRIPTION OF THE PREFERRED EMBODIMENTS

Figure 1:
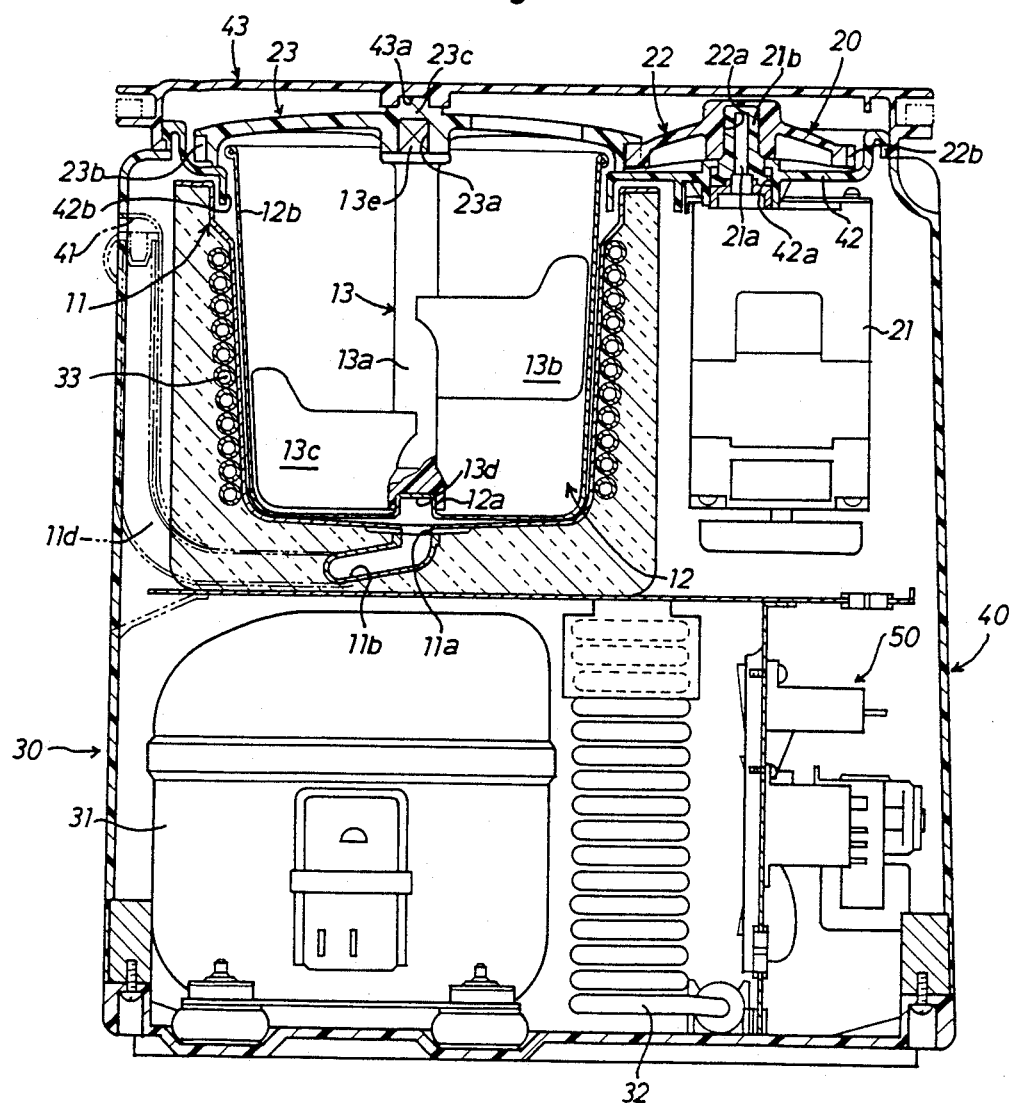
FIG. 1 is a vertical cross-sectional view of an icecream-making machine to which is adapted an electric control apparatus according to the present invention.

With reference to FIG. 1 of the drawings, the icecream-making machine comprises a freezing vessel 11 of substantially cylindrical shape, a removable icecream-forming container 12 coupled within the freezing vessel 11, a removable stirring paddle 13 settled in the container 12, a drive mechanism 20 for stirring paddle 13 and a refrigerating system 30 including a compressor 31, a condenser 32 and an evaporator coil 33. The component parts described above are housed in a box-type cabinet 40. The freezing vessel 11 is surrounded by the evaporator coil 33 for thermal exchange therewith and embedded in a heat-insulative layer. The freezing vessel 11 opens at the top and has a bottom formed at its center with an aperture 11a to which a drain plug 11b is fixedly attached in a fluid-tight manner. A flexible drain hose 11d of elastic material is connected at its one end to the drain plug 11b and extends outwardly from the cabinet 40 through a portion of the heat-insulative layer. The outer end portion of flexible drain hose 11d is removably supported in place by engagement with a holder 41 secured to the external side wall of cabinet 40.

The icecream-forming container 12 is formed substantially in the same configuration as the freezing vessel 11 and formed smaller in diameter than the freezing vessel 11 to define a slight interspace therebetween when it has been coupled within the freezing vessel 11. The container 12 has a bottom which is formed at its center with a projection 12a. The stirring paddle 13 comprises a rotary shaft 13a of synthetic resin and two blades 13b and 13c integral with the rotary shaft 13a. The upper blade 13b is inclined with respect to the rotary shaft 13a to have the function of scraping the vertical walls of container 12 and of conveying the frozen mass upwards. Similarly, the lower blade 13c is inclined with respect to the rotary shaft 13a to have the function of scraping the vertical walls and bottom of container 12 and of conveying the frozen mass upwards. The rotary shaft 13a is formed at its lower end with a cylindrical recess 13d which is rotatably coupled with the bottom projection 12a of container 12. The rotary shaft 13a has an upper end 13e of rectangular cross-section which is coupled with a corresponding recess 23a in a driven gear 23 of large diameter. When settled in the container 12, the rotary shaft 13a of stirring paddle 13 is positioned in place by engagement with the bottom projection 12a of container 12 at its lower end recess 13d and engagement with the recess 23a of gear 23 at its upper end 13e. Thus, the blades 13b and 13c of stirring paddle 13 are positioned to scrape the vertical walls and bottom of container 12.

The drive mechanism 20 includes an electric motor 21, a drive gear 22 of small diameter and the driven gear 23 of large diameter. The electric motor 21 is housed in the cabinet 40 at one side of the heat-insulative layer for freezing vessel 11 and mounted on an upper plate 42 of cabinet 40. The electric motor 21 has an output shaft 21a which protrudes upwards from a hole 42a of small diameter provided in the upper plate 42. An adapter 21b is coupled over the output shaft 21a of motor 21 for rotation therewith and is rotatably coupled within a stepped portion of the hole 42a. The adapter 21b has a head portion of rectangular cross-section which protrudes upwards from the hole 42a to carry the drive gear 22 thereon. The drive gear 22 is formed at its hub portion with a recess 22a of rectangular cross-section which is removably coupled with the head portion of adapter 21b for rotation therewith. The driven gear 23 of large diameter is formed at its hub portion with the recess 23a which is removably coupled with the upper end 13e of stirring paddle 13 as described above. When the driven gear 23 is coupled at its recess 23a with the upper end 13e of stirring paddle 13, the teeth of driven gear 23 are brought into meshing engagement with the teeth 22b of drive gear 22 to be driven by the electric motor 21.

The compressor 31 and condenser 32 of the refrigerating system 30 are housed within a lower compartment of cabinet 40 and connected to each other. The evaporator coil 33 in conditions for thermal exchange with the freezing vessel 11 is connected in a usual manner at its one end to the condenser 32 through a dryer and a capillary tube (not shown) and at its other end to the compressor 31. When the compressor 31 is activated in response to closing of a power switch SW connected thereto, a refrigerating fluid circulates through the condenser 32 and evaporator coil 33 to cool the freezing vessel 11. In the icecream-making machine, a transparent lid 43 of hard synthetic resin is removably coupled over an outer peripheral rim of upper plate 42 of cabinet 40. The lid 43 is formed at its internal wall with a cylindrical recess 43a which is rotatably coupled with a central projection 23c of driven gear 23 when the lid 43 has been coupled over the upper plate 42 of cabinet 40. The coupling of the lid 43 with the central projection 23c of driven gear 23 is useful to position the driven gear 23 and stirring paddle 13 in place.

Figure 2:
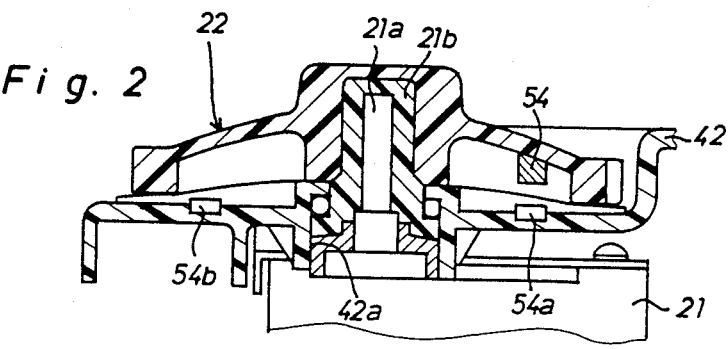
FIG. 2 is an enlarged cross-sectional view of a portion of the icecream-making machine showing a magnetic pick-up transducer.
Figure 3:
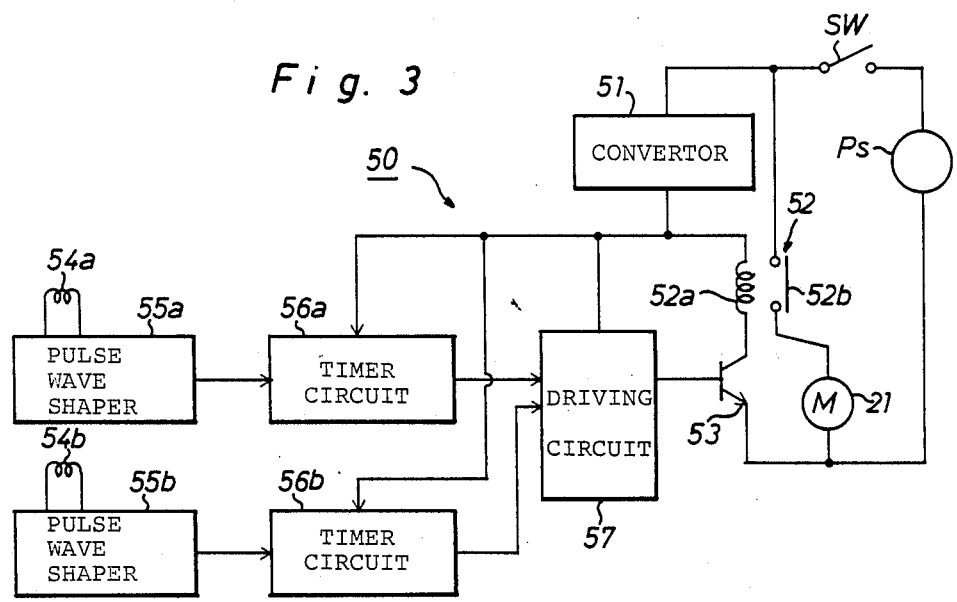
FIG. 3 is a block diagram of the electric control apparatus for the icecream-making machine shown in FIG. 1.

In FIG. 2 there is illustrated an electric control apparatus 50 for the icecream-making machine which comprises a converter 51, a relay 52 and a transistor 53. The converter 51 is connected to a commercially available power source Ps (AC 100V) through the power switch SW to convert an AC voltage from power source Ps into a DC voltage Vc. A coil 52a of relay 52 is connected at its one end to an output terminal of converter 51 and at its other end to a collector of transistor 53, and a normally open switch 52b of relay 52 is connected at its one end to the power source Ps through the power switch SW and at its other end to the power source Ps through the electric motor 21. In a condition where the transistor 53 is conductive to energize the relay coil 51a, the relay switch 52b is maintained in a closed position to activate the electric motor 21. When the transistor 53 becomes non-conductive to deenergize the relay coil 52a, the relay switch 52b is opened to deactivate the electric motor 21.

The electric control apparatus 50 further comprises a magnetic pick-up transducer including a pair of pick-up coils 54a and 54b which are mounted on the upper plate 42 of cabinet 40, as shown in FIG. 2, and arranged symmetrically with respect to the hole 42a. A permanent magnet 54 is secured to a bottom portion of drive gear 22 to oppose the pick-up coils 54a and 54b during rotation of the drive gear 22. The pick-up coils 54a and 54b cooperate with the permanent magnet 54 to successively produce an induced voltage therefrom in accordance with the rotational speed of drive gear 22. A pulse wave shaper 55a is connected to the pick-up coil 54a to successively reshape the induced voltage into a pulse voltage. Similarly, a pulse wave shaper 55b is connected to the pick-up coil 54b to successively reshape the induced voltage into a pulse voltage.

The electric control apparatus 50 further comprises a timer circuit 56a which is connected to the output terminal of converter 51 to start measurement of a predetermined period of time when activated and reset in response to the DC voltage applied thereto from the converter 51. The timer circuit 56a is further connected to the pulse wave shaper 55a to be reset in response to the pulse voltage from wave shaper 55a when one half a period of the pulse voltage is less than the predetermined period of time. When reset, the timer circuit 56a restarts to measure the predetermined period of time. When one half the period of the pulse voltage from wave shaper 55a becomes equal to the predetermined period of time, the timer circuit 56a produces an output signal therefrom when it has finished measurement of the predetermined period of time. In this embodiment, the predetermined period of time is selected to correspond with half a time for one rotation of the drive gear 22 when the icecream has been completed on its achieving a preferred consistency.

Similarly to the timer circuit 56a, a timer circuit 56b is connected to the output terminal of converter 51 to start measurement of a predetermined period of time when activated and reset in response to the DC voltage applied thereto from the converter 51. The timer circuit 56b is further connected to the pulse wave shaper 55b to be reset in response to the pulse voltage from wave shaper 55b when one half a period of the pulse voltage is less than the predetermined period of time. When reset, the timer circuit 56b restarts to measure the predetermined period of time. When one half the period of the pulse voltage from wave shaper 55b becomes equal to the predetermined period of time, the timer circuit 56b produces an output signal therefrom when it has finished measurement of the predetermined period of time. The timer circuits 56a and 56b are connected to a driving circuit 57 which is provided to produce therefrom a driving signal for energization of the transistor 53 when applied with the DC voltage Vc from the converter 51 and to cease production of the driving signal in response to the output signal from the timer circuit 56a or 56b. From the above description, it will be understood that the transistor 53 is energized or deenergized under control of the driving circuit 57 to control the operation of electric motor 21. As shown in FIG. 1, the electric control apparatus 50 is mounted to a vertical plate in the lower compartment of cabinet 40.

When it is desired to prepare icecream, a small amount of water is introduced into the freezing vessel 12 in a condition where the outer end portion of drain hose 11d is supported in place by engagement with the holder 41. On the other hand, a desired amount of ingredients to be frozen into icecream is prepared in the icecream-forming container 12. Thereafter, the container 12 is coupled within the freezing vessel 11 such that the container 12 is immersed in the water stored within the vessel 11. Subsequently, the drive gear 22 is coupled with the adapter 21b of electric motor 21, while the rotary shaft 13a of stirring paddle 13 is coupled at its upper end 13e with the recess 23a of driven gear 23 and at its lower end recess 13d with the bottom projection 12a of container 12. Thus, the stirring paddle 13 is settled in place in the container 12, and the driven gear 23 is brought into meshing engagement with the drive gear 22. Finally, the lid 43 is fixedly coupled over the upper plate 42 of cabinet 40 in such a manner that it is coupled at its recess 43a with the central projection 23c of driven gear 23.

After the icecream machine has been set as described above, the compressor 31 is activated by the electric power supplied thereto in response to closing of the power switch SW. This causes the refrigerating fluid to circulate through the condenser 32 and evaporator coil 33. In this instance, the converter 51 of the electric control apparatus produces the DC voltage therefrom in response to the AC voltage applied thereto from the power source Ps, the timer circuits 56a, 56b are reset in response to the DC voltage from converter 51 to start measurement of the predetermined period of time, respectively, and the driving circuit 57 produces the driving signal therefrom in response to the DC voltage from converter 51. When the transistor 53 is energized by the driving signal applied thereto, the relay switch 52b is closed by energization of the relay coil 52a to start the electric motor 21. Thus, the stirring paddle 13 is driven by the motor 21 through the speed reduction gears 22, 23 to whip the ingredients in container 12, while the freezing vessel 11 is cooled by thermal exchange with the evaporator coil 33 to first freeze the water in the interspace between vessel 11 and container 12 and to subsequently freeze the ingredients. In this instance, the film of frozen ice between vessel 11 and container 12 is useful to prevent rotation of the container 12 with the stirring paddle 13 and to ensure good cold transmission from the evaporator coil 33 to the container 12.

In the course of formation of icecream, the pick-up coils 54a and 54b cooperate with the permanent magnet 54 to successively produce an induced voltage therefrom in accordance with the rotational speed of drive gear 22, the pulse wave shapers 55a and 55b act to successively reshape the induced voltage respectively applied thereto into a pulse voltage, and the timer circuits 56a and 56b each are reset in response to the pulse voltage from the wave shapers to restart measurement of the predetermined period of time. While the viscous resistance of icecream is still in a small value, one half a period of the pulse voltage is less than the predetermined period of time. Under this condition, the timer circuits 56a and 56b do not produce any output signal therefrom. When the rotational speed of stirring paddle 13 is decreased due to an increase of the viscous resistance of icecream, the period of the pulse voltage from wave shapers 55a, 55b becomes long. When the icecream is completed on its achieving a preferred consistency, the period of the pulse voltage from wave shapers 55a, 55b becomes equal to the predetermined period of time and in turn, the timer circuit 56a or 56b produces an output signal therefrom when it has finished measurement of the predetermined period of time. As a result, the driving circuit 57 ceases production of the driving signal in response to the output signal from the timer circuit 56a or 56b and in turn, the transistor 53 is deenergized to open the relay switch 52b so as to deactivate the electric motor 21.

From the above description, it will be understood that in the electric control apparatus, the period of the pulse voltage from wave shapers 55a, 55b is effectively utilized to cut off the supply of DC voltage to the electric motor 21 when one half the period of the pulse voltage has become equal to the predetermined period of time. With the electric control apparatus, the electric motor 21 is automatically stopped without any time delay immediately after the icecream has been completed on its achieving a preferred consistency. Thus, consumption of the electric power and unduly stresses acting on the drive mechanism 20 can be minimized. In a practical embodiment of the present invention, the predetermined period of time measured by the timer circuits 56a, 56b can be selected by the user taking into account of only the preferred consistency of icecream. Accordingly, the automatic control of the electric motor 21 can be effected in a simple manner without any undesired influence caused by a difference in characteristics of the electric motor or a difference in commercial frequency of the electric power. Furthermore, the electric control apparatus is effective to cut off the supply of DC voltage to the electric motor 21 when the power switch SW has been closed in a condition where the drive gear was removed and is also effective to automatically stop the electric motor 21 in the occurrence of unexpected mechanical lock in the drive mechanism 20.

Figure 4:
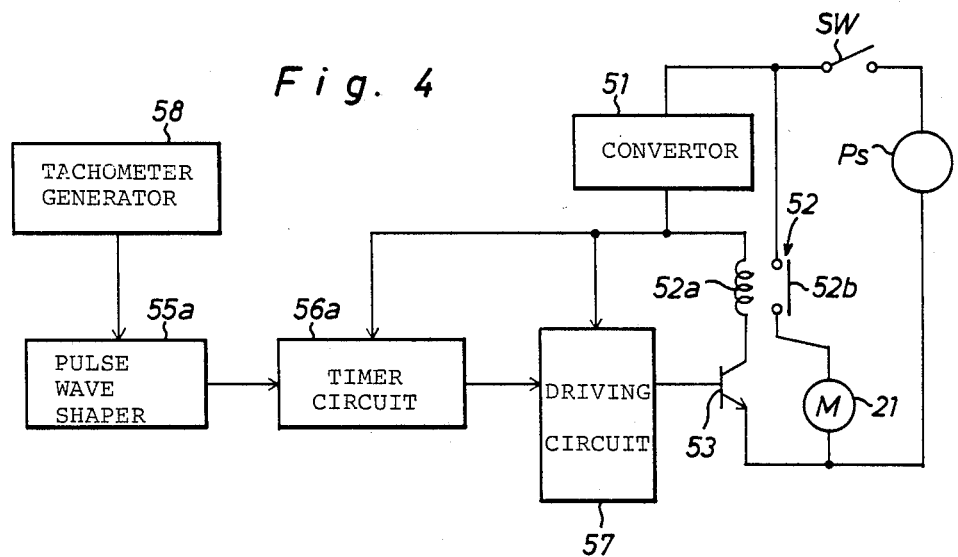
FIG. 4 is a block diagram of a modification of the electric control apparatus.

In a practical embodiment of the present invention, the number of pick-up coils 54a, 54b may be modified appropriately in necessity, and the magnetic pick-up transducer may be replaced with another detecting element such as a photo-interrupter. Furthermore, the electric control apparatus 50 may be modified as shown in FIG. 4, wherein the permanent magnet 54 and pick-up coils 54a, 54b are replaced with a tow-pole tachometer generator 58, and wherein the pulse wave shaper 55b and timer circuit 56b are eliminated. In this modification, the tachometer generator 58 is arranged to detect the rotational speed of the electric motor 21 thereby to produce an induced voltage therefrom at a period proportional to the rotational speed of the motor. In operation, the pulse wave shaper 55a acts to successively reshape the induced voltage from tachometer generator 58 into a pulse voltage, and the timer circuit 56a produces an output signal therefrom when one half a period of the pulse voltage from wave shaper 55a has become equal to the predetermined period of time.

What is claimed is:

1. An electric control apparatus for an icecream-making machine wherein a stirring paddle is settled in an icecream-forming container in conditions for thermal exchange with an evaporator coil of a refrigerating system and is driven by an electric motor to whip icecream ingredients stored in the container, the electric control apparatus comprising:

sensing means for detecting the rotational speed of said stirring paddle for producing a pulse signal therefrom at a period inversely proportional to the detected rotational speed;

output means responsive to the pulse signal from said sensing means for producing an output signal therefrom when 1/n of the period of the pulse signal is more than a predetermined period of time and for ceasing production of the output signal when 1/n of the period of the pulse signal has become less than the predetermined period of time; and power supply means for permitting supply of an electric power to said motor when said output means is conditioned to cease production of the output signal and for cutting off the supply of the electric power to said motor in response to the output signal from said output means.

2. An electric control apparatus as claimed in claim 1, wherein said sensing means includes:

a magentic pick-up transducer arranged to successively produce an induced voltage therefrom in accordance with the rotational speed of said stirring paddle, and a pulse wave shaper connected to said transducer to successively reshape the induced voltage into a pulse voltage.

3. An electric control apparatus as claimed in claim 2, wherein said output means comprises:

a timer circuit connected to an electric power source through a converter to start measurement of a predetermined period of time when activated and reset in response to a DC voltage applied thereto from said converter and being connected to said pulse wave shaper to be reset in response to the pulse voltage when 1/n of a period of the pulse voltage is less than the predetermined period of time and to produce an output signal therefrom when 1/n of the period of the pulse voltage becomes equal to the predetermined period of time.

4. An electric control apparatus as claimed in claim 3, wherein said power supply means comprises:

a relay including a normally open switch disposed in a power supply line for energizing said electric motor and a coil connected to one end thereof to said converter to close said switch when it had been energized;

a transistor having a collector connected to the other end of said relay coil and an emitter connected to said power source; and a driving circuit connected to a base of said transistor and being connected to said timer circuit to produce a driving signal for energization of said transistor when applied with the DC voltage from said converter and to cease production of the driving signal in response to the output signal from said timer circuit.

* * * * *